United States Patent [19]
McGill et al.

[11] Patent Number: 4,874,305
[45] Date of Patent: Oct. 17, 1989

[54] ACCUMULATOR EXTRUSION HEAD FOR PRODUCING STRIPED PARISONS

[75] Inventors: Paul E. McGill, Neshanic; Frank J. Pitigliano, Bedminister, both of N.J.

[73] Assignee: Somerset Technologies, Inc., New Brunswick, N.J.

[21] Appl. No.: 266,689

[22] Filed: Nov. 3, 1988

[51] Int. Cl.[4] .............................. B29C 47/54
[52] U.S. Cl. .................. 425/131.1; 264/173; 264/209.8; 425/376.1; 425/381; 425/462; 425/466
[58] Field of Search ............ 425/106, 131.1, 132, 425/133.1, 376.1, 380, 381, 462, 466, 467, 532; 264/45.5, 171, 173, 515, 540, 541, 209.1, 209.8; 428/35, 36

[56] References Cited

U.S. PATENT DOCUMENTS

| | | | |
|---|---|---|---|
| 3,023,461 | 3/1962 | Sherman | 264/515 |
| 3,257,482 | 6/1966 | Schechter | 425/532 X |
| 3,326,399 | 6/1967 | Ausnit | 264/209.8 X |
| 3,461,822 | 8/1969 | Rikert et al. | 425/106 |
| 3,579,733 | 5/1971 | West | 425/381 |
| 3,901,958 | 8/1975 | Doll | 264/45.5 |
| 4,056,344 | 11/1977 | Lemelson | 425/132 |
| 4,248,824 | 2/1981 | Hattop | 264/171 |
| 4,297,092 | 10/1981 | Goron | 264/540 X |
| 4,302,170 | 11/1981 | Goron | 425/381 X |
| 4,422,838 | 12/1983 | Iwawaki et al. | 425/381 X |
| 4,548,569 | 10/1985 | Pitigliano et al. | 425/133.1 |
| 4,563,147 | 1/1986 | Langecker | 425/532 X |
| 4,609,340 | 9/1986 | Irwin et al. | 425/532 |
| 4,783,299 | 11/1988 | Prevotat | 425/133.1 X |
| 4,802,833 | 2/1989 | Shapler | 425/131.1 |

FOREIGN PATENT DOCUMENTS

| | | |
|---|---|---|
| 49-16541 | 4/1974 | Japan. |
| 55-10964 | 3/1980 | Japan. |
| 61-89024 | 5/1986 | Japan. |
| 626945 | 7/1949 | United Kingdom. |

*Primary Examiner*—Richard L. Chiesa
*Attorney, Agent, or Firm*—Fay, Sharpe, Beall, Fagan, Minnich & McKee

[57] ABSTRACT

An accumulator extrusion head assembly for producing a parison having at least one stripe extending longitudinally thereof comprises an extrusion head body member having an opening extending inwardly from a nozzle outlet end and a mandrel positioned in the body member to define a generally annular extrusion chamber terminating in an annular outlet nozzle. An annular ram is mounted in the extrusion chamber and has a forward end positioned for reciprocation toward and away from the outlet nozzle. A first supply extruder is connected to the body member through first passages for supplying a first extrusion material to the annular extrusion chamber. A second supply extruder is also connected to the body member through second passages for supplying a second extrusion material to the annular extrusion chamber. The second passages include a supply outlet in the forward end of the ram for providing a radially continuous stripe of the second extrusion material to the annular extrusion chamber and, a connecting passage for maintaining a flow connection between the second extruder and the supply outlet during reciprocation of the ram.

8 Claims, 2 Drawing Sheets

ACCUMULATOR EXTRUSION HEAD FOR PRODUCING STRIPED PARISONS

BACKGROUND OF THE INVENTION

The subject invention is directed toward the art of plastic molding apparatus and more particularly, to an accumulator head apparatus capable of forming parisons having a longitudinally extending stripe.

Many different types of continuous extrusion apparatus are known which are capable of producing striped plastic products. Typically, the stripes have been produced by applying or extruding a layer of a different color plastic over the main extrusion as it passes through the die. In some instances the stripe has been applied as a continuous strip of a clear or different color plastic which extends completely through the extrusion from the inner surface to the outer surface.

The extrusion of a continuous stripe complete through the extrusion product has not been possible, however, when accumulator type extrusion heads have been used.

BRIEF SUMMARY OF THE INVENTION

The subject invention permits the introduction of a stripe of material in the plastic parison when accumulator heads are used to form plastic parts. The stripe of plastic material can be a second material which is of a different color or type than that used for the remainder of the parison. Depending on the purpose of the product, the stripe can perform either a decorative or utilitarian function.

Specifically, according to the invention the apparatus for producing striped parisons comprises an extrusion head body member having an opening extending inwardly from a nozzle outlet end. A mandrel is positioned in the body member to define a generally annular extrusion chamber terminating in an annular outlet nozzle. Mounted in the extrusion chamber is an annular ram having a forward end positioned for reciprocation toward and away from the outlet nozzle. A first supply means is connected to the body member through first passage means for supplying a first extrusion material to the annular extrusion chamber. A second supply means is also connected to the body member through second passage means for supplying a second extrusion material to the annular extrusion chamber. The second passage means includes a supply outlet in the forward end of the ram for providing a radially continuous stripe of the second extrusion material to the annular extrusion chamber. The second passage means further includes a connecting passage means for maintaining a flow connection between the second extruder and the supply outlet during reciprocation of the ram.

Preferably, the first passage means includes a passage extending through the ram to an annular outlet in the forward end of the ram. The second passage means connects to an outlet which is circumferentially separated from the annular outlet but which opens radially across the annular extrusion chamber.

Preferably, and in accordance with a more limited aspect of the invention, the first and second passage means each include a plurality of outlets in the forward end of the ram. The outlets are radially aligned so that the resulting parison is of one material in any radial plane.

In accordance with a further embodiment, the first and second outlet openings have substantially different circumferential widths so that the material supplied through the second supply means is extruded as a thin narrow strip longitudinally of the parison Accordingly, a primary object of the invention is the provision of an accumulator head assembly by which it is possible to extrude parisons having radially continuous strips of a material which is different than the material forming the main wall of the parison.

Yet another object is the provision of an accumulator head assembly of the type described wherein the supply of material to the accumulation chamber can take place during the movement of the extrusion ram.

Yet a further object of the invention is the provision of an apparatus of the type described wherein movement of the extrusion ram between different positions does not affect the ability of the apparatus to extrude parisons with continuous stripes.

The above and other objects and advantages will become apparent from the following description when read in conjunction with the accompanying drawings wherein:

DETAILED DESCRIPTION OF THE DRAWINGS

Figure 1:
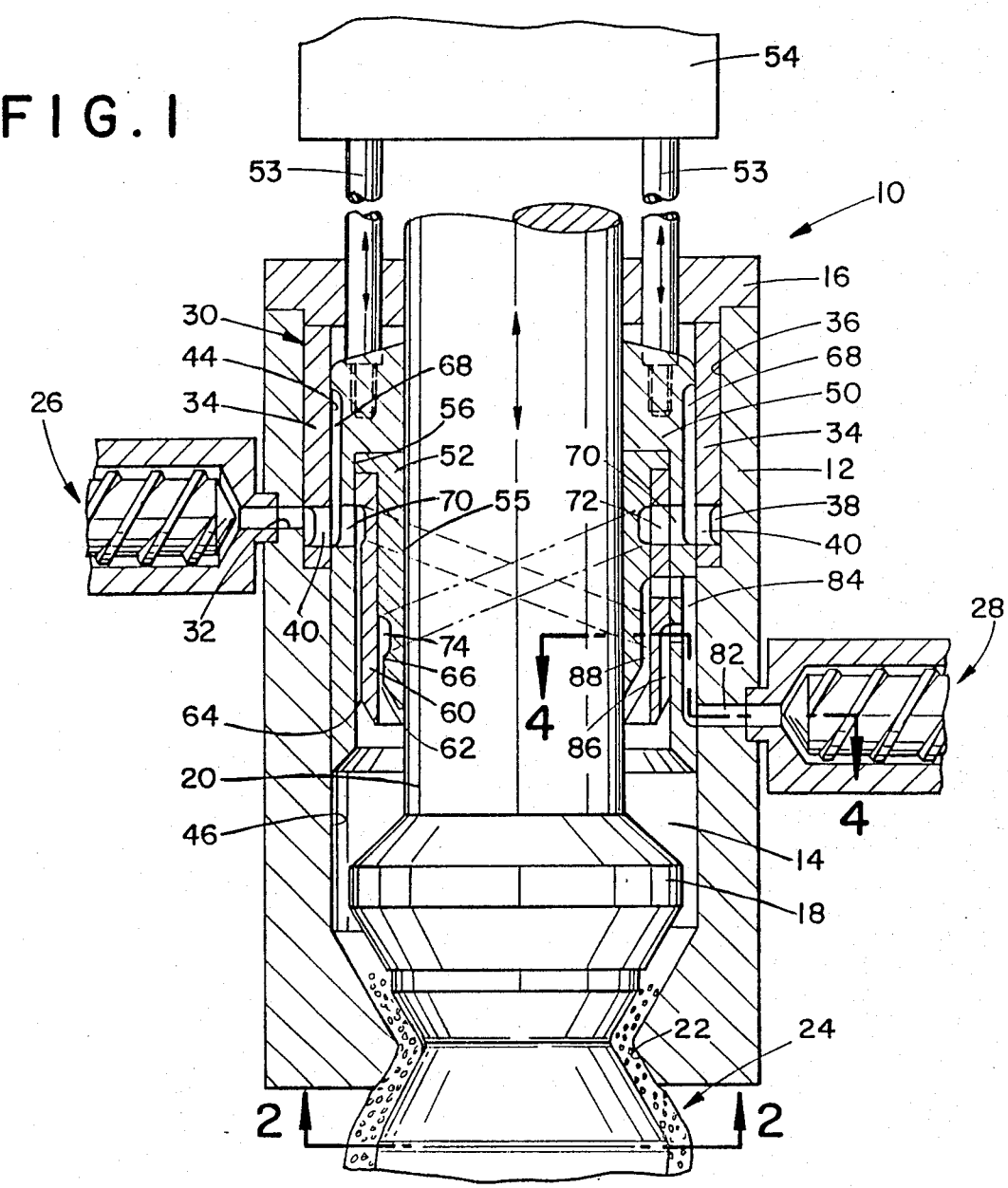
FIG. 1 is a vertical cross-sectional view through an accumulator type extrusion head assembly formed in accordance with the subject invention.

Referring more particularly to the drawings wherein the showings are for the purpose of illustrating a preferred embodiment of the invention only, and not for the purpose of limiting same, FIG. 1 shows the overall arrangement of an accumulator type extrusion head assembly designed for extruding a parison having a longitudinally extending stripe carried therein. The extrusion accumulator type head assembly is broadly identified with the reference numeral 10 and comprises a main extrusion head body or pressure housing 12 of generally cylindrical configuration and which defines an extrusion chamber 14. The upper end of the body 12 is closed by an end plate 16 suitably secured to the main body in any convenient manner. A mandrel 18 is carried axially within the extrusion chamber 14 by a supporting rod 20. As shown, the supporting rod 20 is axially located relative to the cylindrical extrusion chamber 14 and extends inwardly through the end plate 16. It should be appreciated that the support rod 20 and the associated mandrel 18 are arranged for limited controlled reciprocation by conventional power and control apparatus not shown.

Figure 2:
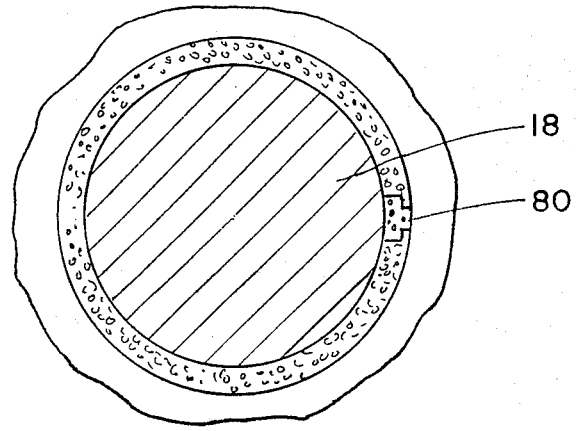
FIG. 2 is a cross-sectional view taken on line 2—2 of FIG. 1.

The mandrel 18 is illustrated as extending through and outwardly of the lower end of the main body 12. As best shown in FIGS. 1 and 2, the mandrel 18 extends through the cylindrical opening 22 in the lower end of the extrusion chamber 14 to define an annular outlet nozzle 24.

Associated with the extrusion head assembly are first and second screw type extruders 26 and 28 respectively. The extruders and 26 and 28 function to supply suitable plastics under pressure to the extrusion chamber 14. In accordance with the invention and for reasons which will subsequently become apparent the two extruders 26 and 28 are intended to supply different colored plastics or plastics having different physical characteristics so that the resulting parison will have individual longitudinal stripes of material of different color or physical characteristics. In this regard, the accumulator head assembly 10 includes a piston or ram assembly 30 which has a special design and is connected in a particular manner with the respective extruders 26, 28.

The extruders 26, 28 form no particular part of the subject invention and could be any standard extruder devices commonly used to supply plastic to such accumulator head assemblies. In the subject embodiment, however, they are shown as screw conveyors and are connected into diagonally opposite sides of the accumulator head assembly 10. The first extruder 26 is connected through an opening 32 which connects into the upper end of the chamber 14 through an internal sleeve member 34. The sleeve member 34 is suitably received in a recess 36 formed in the upper end of the main accumulator head body 12. As shown, a circumferential groove 38 is formed about the exterior of the sleeve 34 at the same elevation as the inlet passage 32. The groove 38 distributes the plastic supplied from the nozzle of the extruder 26 about the chamber 14 and is provided with suitable inlet openings 40 which are distributed about the circumference of the chamber 14. It should be noted that the interior surface 44 of the sleeve 34 is coextensive with the interior surface 46 of the chamber 14.

Figure 3:
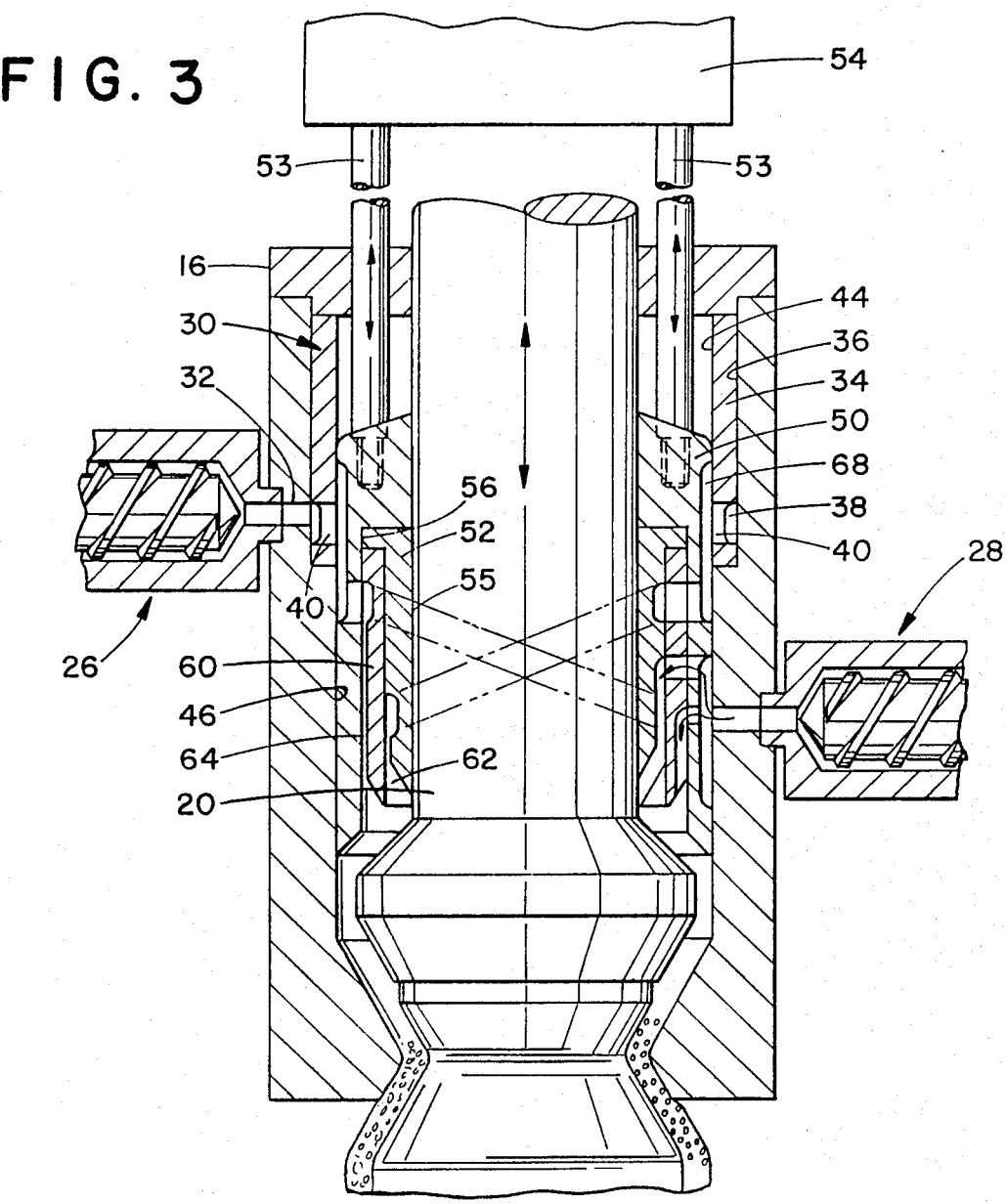
FIG. 3 is a view similar to FIG. 1 but showing the ram portion of the accumulator type extrusion head assembly in a forward position.
Figure 4:
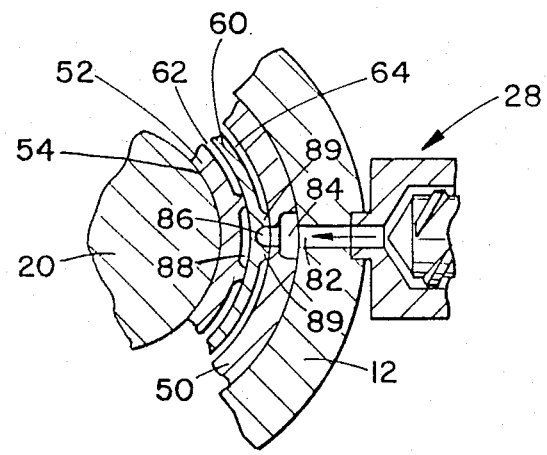
FIG. 4 is a cross-sectional view taken on line 4—4 of FIG. 1.

Mounted within the extrusion chamber 14 and adapted to be reciprocated therein is the previously mentioned ram assembly 30. Ram assembly 30 comprises, as best shown in FIGS. 1, 3 and 4, a main ram body member 50 which has its exterior surface sized so as to be closely and tightly received within the extrusion chamber 14 in generally sealing engagement with the wall surfaces 44, 46. The ram 50 is reciprocated in the extrusion chamber by suitable drive rods 53 connected to the upper end of the ram and extending outwardly to a power unit 54. The power unit 54 is conventional and acts to control the reciprocation of the ram 50 in accordance with the particular needs of the overall system.

Carried within the lower end of the main ram member 50 is a first sleeve member 52 which has an inner diameter 55 to closely engage the outer surface of the rod 20. As illustrated, the sleeve 52 is suitably received in a recess 56 formed in the lower end of the ram body 50. The sleeve 52 is retained in the ram body 50 in a suitable manner such as through the use of machine screws or the like not shown.

A second sleeve member 60 is also received in the lower of the ram 50 in the manner shown. Specifically, the sleeve 60 rests in an external recess formed on sleeve 52.

The sleeve members 52 and 60 cooperate to define generally circumferentially extending inner and outer chambers 62 and 64 respectively. In particular, it would be noted that the inner sleeve member 52 has a reduced diameter lower section 66 which defines the inner chamber 62 in combination with the inner surface of the outer sleeve member 60. Extrusion material from the first extruder 26 is supplied to this inner chamber 62 by suitable passages connected with the circumferential passage 38 and the openings 40. In this regard, it should be noted that the main ram body 50 includes a circumferential groove 68 having a substantial axial length. The groove 68 is connected to inner chamber 62 through openings 70, 72 formed in the ram body 50 and the sleeve 62 respectively. These openings connect with a diagonally extending circumferential groove 74 formed in the exterior of the inner sleeve 52 at the upper end of reduced diameter section 68. Thus, plastic injected into the circumferential groove 38 can flow directly to the inner chamber 62 for discharge into the extrusion chamber 14. Similarly, plastic is supplied to the outer chamber 64 from the first extruder 26. For this reason, the opening 70 connects with the upper end of passageway 64.

The extruder 28 is arranged to conduct a different material into the extrusion chamber 14 than is being supplied by extruder 26. The material supplied from extruder 28 is supplied to the chamber in a relatively narrow radially continuous strip which produces a stripe in the final extruded parison as shown in FIG. 2. That is, the preferred design is such that a overlapping stripe of a T cross-section design 80 results in the parison extruded from the outlet nozzle 24. The stripe could, however, be of a simple non-overlapping shape. In order to provide the stripe 80, the material being extruded from extruder 28 is conducted through the opening 82 to the interior of the extrusion chamber 14 and passes up a small opening in the form of a vertical groove 84 formed in the exterior of the main ram body 50 (see FIG. 4). From groove 84 a first opening conducts or permits the flow of plastic through the ram wall to a second vertically extending small opening or groove 86 formed in the exterior of sleeve member 60. Note that the vertical groove 86 is separated from the annular recess or chamber 64 by end walls 89. At the upper end of groove 84 openings are formed through the ram wall and the sleeve 60 to a vertically extending small opening or groove 88 formed in the exterior of the inner sleeve member 52. Vertical groove 88 is significantly wider than the groove 86. Accordingly, the plastic injected into chamber 14 through the two grooves 86, 88 meets at the lower end of these grooves in a somewhat inverted T-shape as illustrated in FIG. 2. The plastic which is injected here, however, fills completely across the interior of the pressure chamber in a radial direction such that it forms a radially continuous portion of the parison wall. Consequently, if the plastic injected by the extruder 28 is of a different color a distinctive stripe appears in the parison. Alternatively, if a clearer plastic is injected through the extruder 28 a clear strip results allowing it to be used as a level indicator or the like in the resulting container made from the parison.

Obviously, modifications and alterations of the preferred embodiment will occur to others upon a reading and understanding of the subject specification. It is accordingly, intended to include all such modifications and alterations as part of the invention insofar as they come within the scope of the appended claims.

What is claimed is:

1. An accumulator extrusion head assembly for producing a parison having at least one stripe extending longitudinally thereof comprising:
   an extrusion head body member having an opening extending inwardly from a nozzle outlet end;
   a mandrel positioned in said body member to define a generally annular extrusion chamber terminating in an annular outlet nozzle;

an annular ram mounted in said extrusion chamber and having a forward end positioned for reciprocation toward and away from said outlet nozzle;

a first supply means connected to said body member through first passage means for supplying a first extrusion material to said annular extrusion chamber;

a second supply means connected to said body member through second passage means for supplying a second extrusion material to said annular extrusion chamber, said second passage means including a passage comprising a plurality of small openings extending through said ram and along a longitudinal direction of said ram terminating in a supply outlet means in the forward end of said ram for providing a radially continuous stripe of said second extrusion material to said annular extrusion chamber; and, said second passage means further including a connecting passage means for maintaining a flow connection between said second supply means and said supply outlet during reciprocation of said ram.

2. The assembly as defined in claim 1 wherein said first passage means includes a passage extending through said ram to an annular outlet in the forward end of said ram.

3. The assembly as defined in claim 1 wherein said first passage means includes a plurality of annular outlets in the forward end of said ram.

4. An accumulator head for producing a parison having at least one stripe extending longitudinally thereof comprising:

an extrusion head body member and a central mandrel cooperating to define an annular extrusion chamber terminating in an annular outlet nozzle;

an annular ram mounted in said extrusion chamber for reciprocation toward and away from said outlet nozzle;

first supply means for supplying a first extrusion material to said extrusion chamber; and, second supply means for supplying a second extrusion material to said extrusion chamber, said second supply means including a supply passage means comprising a plurality of small openings extending through said ram and along a longitudinal direction of said ram for supplying a radially continuous stripe of said second extrusion material through the forward end of said ram to said extrusion chamber during movement of said ram toward said outlet nozzle.

5. The accumulator head as defined in claim 4 wherein said ram includes a generally annular discharge outlet in said forward end, and wherein said first supply means supplies first extrusion material to said annular discharge outlet.

6. The accumulator head as defined in claim 5 wherein said generally annular discharge outlet is interrupted by said supply passage means.

7. The accumulator head as defined in claim 4 wherein said supply passage means openings includes first and second outlet openings located in radial alignment in the forward end of said ram.

8. The accumulator head as defined in claim 7 wherein said first and second outlet openings have different circumferential widths.

* * * * *